United States Patent
Tritt et al.

(10) Patent No.: US 10,343,336 B2
(45) Date of Patent: Jul. 9, 2019

(54) TOOL FOR FUSING OUTLET FITTINGS IN A PLASTIC PIPE AND METHOD OF USING THE TOOL

(71) Applicant: McElroy Manufacturing, Inc., Tulsa, OK (US)

(72) Inventors: Michael Tritt, Broken Arrow, OK (US); Eric Abbott, Morris, OK (US)

(73) Assignee: McElroy Manufacturing, Inc., Tulsa, OK (US)

( * ) Notice: Subject to any disclaimer, the term of this patent is extended or adjusted under 35 U.S.C. 154(b) by 411 days.

(21) Appl. No.: 15/040,828

(22) Filed: Feb. 10, 2016

(65) Prior Publication Data
US 2017/0225386 A1 Aug. 10, 2017

(51) Int. Cl.
*B29C 65/02* (2006.01)
*F16L 47/02* (2006.01)
*B29L 23/00* (2006.01)

(52) U.S. Cl.
CPC .............. *B29C 65/02* (2013.01); *F16L 47/02* (2013.01); *B29L 2023/22* (2013.01)

(58) Field of Classification Search
CPC .......... F16L 47/02; B29C 65/02; B29C 65/20; B29C 65/7844; B29C 65/069; B23K 37/0534
See application file for complete search history.

(56) References Cited

U.S. PATENT DOCUMENTS 3,552,265 A * 1/1971 Lucas .................. B29C 65/7802
 144/118
4,352,708 A * 10/1982 McElroy ............. B29C 66/1142
 156/158
4,533,424 A 8/1985 McElroy

FOREIGN PATENT DOCUMENTS

GB 1265915 A 3/1972
JP S5640520 A 4/1981

OTHER PUBLICATIONS

"Ridgid HC-450/HC-300 Operator's Manual," https://cdn2.ridgid.com/resources/media?key=5e2e4809-8ce9-47ba-bf32-e83beafd3802&languageCode=en&countryCode=US&type=document—4 pages printed from Operator's Manual available at Ridgid's website, as printed on May 11, 2016.
Hangzhou Hongli Pipe Machinery Co., Ltd. website: http://cnpipetool.en.made-in-china.com/product/ovEQsNeCrMkn/China-Pipe-Hole-Cutting-Machine-for-up-to-6-Hole-KK150-.html—Screenshot of Hongli's device from website referenced above, as printed on May 11, 2016.
Fujian Minshan Fire-Fighting Equipment Co., Portable Pipe Boring & Tapping & Drilling & Punching Machine—Product description (3 pages) found at:—https://m.allbaba.com/product/60145993038/pipe-cutter-machine-mini-cutting-machine/specifications.html.

* cited by examiner

*Primary Examiner* — Christopher T Schatz
(74) *Attorney, Agent, or Firm* — Frank J. Catalano; Gable Gotwals

(57) ABSTRACT

A tool for use in fusing an outlet fitting in the side wall of a plastic pipe has a base with three perpendicular guide rods. A movable plate is reciprocated on the guide rods in response to manual operation of a rack-and-pinion. The movable plate has a hole oriented to align a drill adapter and an outlet fitting adapter which are interchangeably inserted into the hole on an axis extending through a predetermined point on the longitudinal axis of the pipe. A retractable ratchet strap tightly girts the pipe to secure the tool against the pipe. The ratchet strap assures that the tool always maintains its original orientation on the pipe and the hole assures that interchanged drill and outlet fitting adapters are always returned to their original orientation in the tool. Therefore, the outlet fitting is always fused in its proper orientation in the pipe.

9 Claims, 9 Drawing Sheets

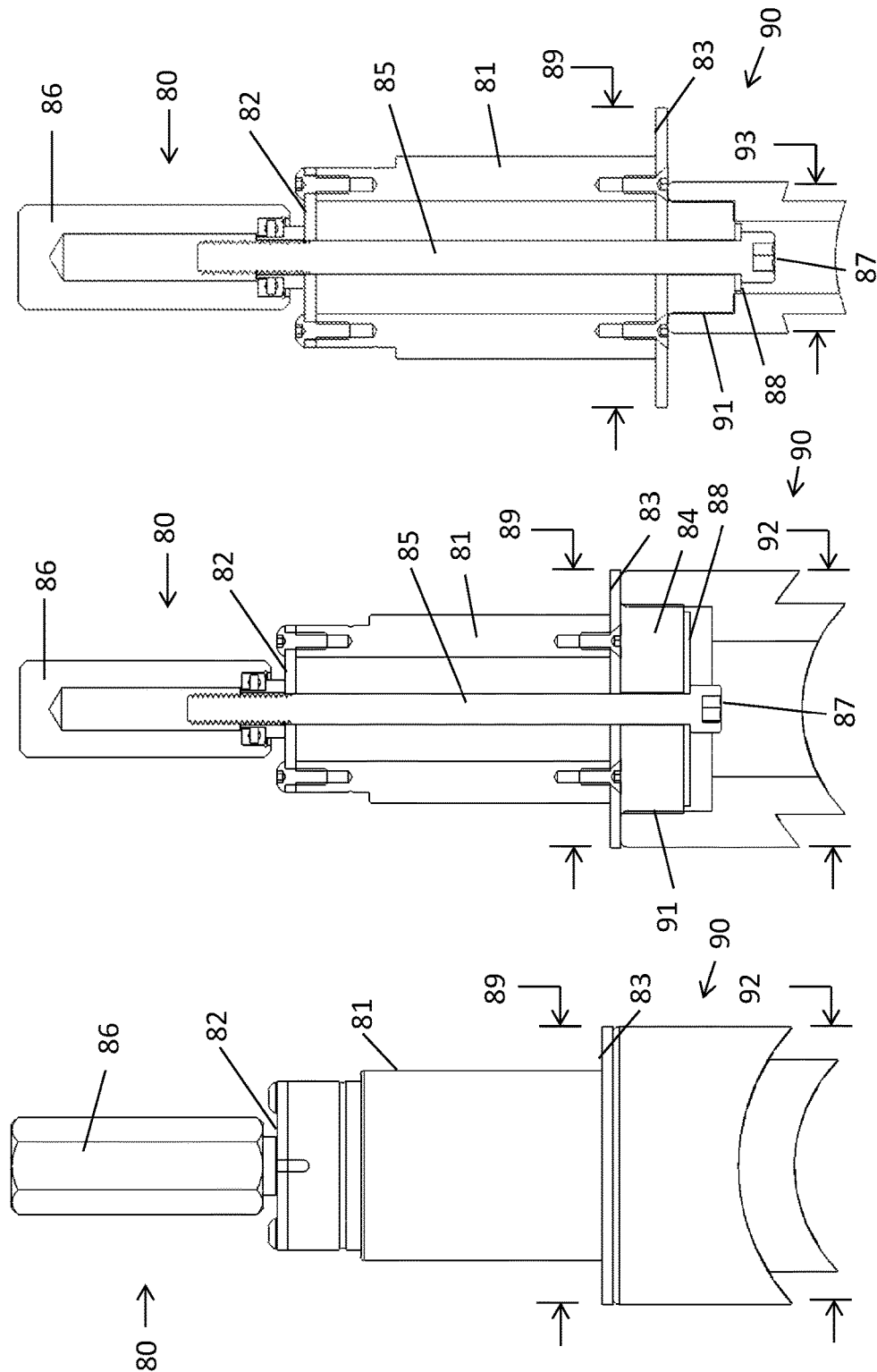

TOOL FOR FUSING OUTLET FITTINGS IN A PLASTIC PIPE AND METHOD OF USING THE TOOL

BACKGROUND OF THE INVENTION

This invention relates generally to the fusion of polypropylene piping system components and more particularly concerns a tool and method for fusing outlet fittings in a plastic pipe.

The fusion of outlet fittings is an alternative to the prior practice of removing a section of pipe from a piping system and welding a pipe-tee between the cut ends. Pipe-tees are often added to piping systems already installed in horizontal, vertical and other angular orientations in ceilings, walls and other confined areas which impose awkward restraints on the operator adding the pipe-tee.

A common first phase of the fusion process is to drill a hole for the fusion outlet fitting in the receiving pipe. Precise radial alignment of the hole is critical to achieving proper fusion of the fitting to the pipe. That is, the center axis of the finished hole should be perpendicular to a tangent to the wall of the pipe and intersect the longitudinal center axis of the pipe. Unfortunately, this seemingly simple precondition poses significant compliance problems. For one, since the hole must be drilled into the cylindrical outer wall of the pipe, the drill bit tends to "walk" the pipe surface as boring begins. As the bit "walks," the intended point and angle of entry of the bit into the pipe changes. For another, the pipe may be loosely secured to the structure or may be secured by structure, such as relatively long or flexible hangers or threaded rods, which is unable to maintain pipe stability during the drilling phase of the process.

The hole drilling phase is followed by the heating phase of the fusion process. The hole is deburred and cleaned out, a constant heater temperature level is established, the heater is inserted into the hole at a force sufficient to create a consistent melt pattern on the diameter of the pipe, the fitting is attached to the heater and any misalignment is corrected by rolling the heater around in the hole or rocking the fitting from side to side in order to get the entire perimeter to show an apparent sign of melt. The rolling and rocking of the heater and fitting bring into play the risks of inconsistent heating of parts of the fitting or pipe and, ultimately, a suboptimal finished joint. The heater is removed from the pipe and fitting when the presence of melted plastic around the entirety of the fitting and pipe are observed.

Inserting the fitting into the pipe happens quickly and often requires a considerable amount of force. As the fitting is pressed into the hole, the pieces of melted plastic begin to combine into one solid piece. There is presently no accurate way to determine whether a fitting is aligning concentrically in a hole. There is presently no machine available as an aid in the entire process of fusing an outlet fitting to a polypropylene piping system. Therefore, fittings are anticipated to be the most likely failure points within a piping system.

Some drilling machines are available with a guide way system translating a drill motor towards and away from metallic or plastic pipes. A few saddle style fusion machines for polyethylene piping systems have the ability to fuse an outlet joint but do not drill a pilot hole, as this style of fitting does not require the hole to be pre-drilled.

It is, therefore, an object of this invention to provide a tool for and method of consistently producing satisfactory outlet fitting fusions. Another object of this invention is to provide an outlet fitting fusion tool which is connected directly to the pipe. It is also an object of this invention to provide an outlet fitting fusion tool capable of establishing a rigid structure and a point of reference for the entirety of the fusion process. And it is an object of this invention to provide an outlet fitting fusion tool capable of maintaining concentricity of a fusion joint throughout the drilling, heating, and fusion phases of the outlet fitting fusion process.

SUMMARY OF THE INVENTION

In accordance with invention, a tool and a method of using the tool are provided for use in fusing an outlet fitting in a side wall of a plastic pipe at a predetermined point along a longitudinal axis of the pipe.

The tool has a proximal base adapted to be secured against the side wall of the pipe. First and second parallel guide rods fixed to the proximal base having center longitudinal axes extending on opposite sides of, and in a plane transverse to, the center longitudinal axis of the pipe. The first and second guide rods are proximal in relation to the predetermined point along the pipe center longitudinal axis. A movable plate mounted for reciprocation on the first and second guide rods has a hole oriented to align a drill adapter and an outlet fitting adapter interchangeably inserted into the hole on an axis extending through the predetermined point. An actuator engaged with the movable plate is used to selectively reciprocate the movable plate on the first and second guide rods toward and away from the pipe.

Preferably, the proximal base has a fixed plate parallel to a plane tangent to the side wall of the pipe and spaced from the predetermined point along the pipe center longitudinal axis. The movable plate is parallel with the fixed plate of the proximal base. The center longitudinal axes of the first and second guide rods are diametrically equidistant from the center longitudinal axis of the pipe. A third guide rod fixed on and perpendicular to the proximal base has a center longitudinal axis intersecting the longitudinal center axis of the pipe. The third guide rod is distal in relation to the predetermined point along the pipe center longitudinal axis. The movable plate is mounted for reciprocation on all three guide rods. The actuator is preferably a rack-and-pinion between and parallel to the first and second guide rods and reciprocates the movable plate in response to manual operation of the pinion of the rack-and-pinion.

In a preferred embodiment, the tool has a base proximal in relation to the pipe and adapted to be secured against the side wall of the pipe with a fixed plate of the base parallel to a plane tangent to the side wall of the pipe and spaced from the predetermined point along the pipe center longitudinal axis. Three parallel guide rods are fixed on and perpendicular to the proximal fixed base. The center longitudinal axes of the first and second guide rods are diametrically equidistant from, and extend in a plane transverse to, the center longitudinal axis of the pipe. A center longitudinal axis of the third guide rod intersects the longitudinal center axis of the pipe. The first and second guide rods and the third guide rod are proximal and distal, respectively, in relation to the predetermined point along the pipe center longitudinal axis. A movable plate is mounted for reciprocation on the three guide rods. The movable plate is parallel with the proximal fixed plate and has a hole oriented to align a drill adapter and a fitting adapter which are interchangeably inserted into the hole on an axis extending through the predetermined point on the center longitudinal axis of the pipe. A rack-and-pinion centered between the first and second guide rods and engaged on the movable plate reciprocates the movable plate on the three guide rods in response to manual operation of the rack-and-pinion.

Preferably, the rack of the rack-and-pinion is parallel to and bisects a plane defined by center axes of the first and second proximal guide rods and extends through an opening in the movable plate which accommodates the pinion of the rack-and-pinion with the teeth of the pinion in engagement with the teeth of the rack.

The tool may also preferably include a distal fixed base secured against the distal ends of the guide rods and parallel to the proximal fixed base, first and second proximal guide bushings and a third distal guide bushing mounted on the movable plate in alignment with and riding on the first and second proximal guide rods and the third distal guide rod, respectively, and multi-spoke handles on each end of the shaft of the pinion facilitating manual operation of the rack-and-pinion to reciprocate the movable plate in relation to the fixed proximal base and toward and away from the pipe.

Also preferably, an outlet fitting adapter of the tool will include a tubular housing with an extended length screw disposed axially through the housing. When the screw is tightened by a knob at one end of the housing, the head of the screw is pulled toward the other end of the housing to compress the thickness of a rubber grippy puck against the housing, expanding the diameter of the rubber grippy puck against an inner diameter of the outlet fitting to secure the outlet fitting to the outlet fitting adapter.

The method includes the steps of applying a mark indicative of the location of the predetermined point on the side wall of the pipe, attaching a tool having a movable base with a precision hole to a location on the pipe, inserting and securing a drill adapter with a selected drill bit in the precision hole, driving the moveable base on the tool toward the pipe sufficiently to determine whether a center axis of the drill bit intersects the applied mark, if necessary adjusting the location of the tool on the pipe to assure that the center axis of the drill bit intersects the mark, securing the tool to the pipe at the assured intersection location, removing the drill adapter with the drill bit from the precision hole, inserting and securing an outlet fitting adapter with a selected outlet fitting in the precision hole and driving the moveable base on the tool toward the pipe sufficiently to determine whether the outlet fitting is satisfactorily oriented for fusion to the pipe with the tool at the assured intersection location of the center axis of the drill bit. If necessary, any of the previous steps are repeated to assure that the center axis of the drill bit intersects the applied mark and that the outlet fitting is satisfactorily oriented with the pipe for a single location of the tool on the pipe.

Once it is assured that the center axis of the drill bit intersects the applied mark and that the outlet fitting is satisfactorily oriented with the pipe for a single location of the tool on the pipe, the method proceeds with the steps of removing the outlet fitting adapter with the outlet fitting from the precision hole, reinserting and securing the drill adapter with the drill bit in the precision hole, applying a drill motor to the drill adapter to translate power to the drill bit and driving the moveable base on the tool toward the pipe sufficiently to bore a fusion hole through the wall of the pipe.

Once the fusion hole is bored, the method proceeds with the steps of removing the drill adapter with the drill bit from the precision hole, reinstalling the outlet adapter with the outlet fitting in the precision hole, inserting a heater between the outlet fitting and the fusion hole in the pipe, driving the moveable base on the tool toward the pipe sufficiently to press the heater into the fusion hole in the pipe, waiting for the presence of melt around the entire perimeter of the fusion hole in the pipe and around the entire perimeter of the outlet fitting, driving the moveable base to separate the outlet fitting adapter from the heater, removing the heater from between the outlet fitting adapter and the fusion hole in the pipe and driving the moveable base toward the pipe sufficiently to create an evenly melted and concentrically applied fitting in the pipe melt pattern of the original fusion hole.

If the time required to create melt around the entire perimeter of the fusion hole in the pipe plastic is significantly greater than the time required to create melt around the entire perimeter of the outlet attachment plastic, after the step of inserting a heater between the outlet fitting and the fusion hole in the pipe, the method may further include the step of placing a thermal barrier between the outlet fitting and the heater to permit the perimeter of the fusion hole to begin to melt before the perimeter of the outlet attachment begins to melt. Once the perimeter of the fusion hole begins to melt, the movable base can be raised to remove the thermal barrier. The movable base can then be driven toward the pipe to push the outlet fitting adapter against the heater and into the fusion hole.

BRIEF DESCRIPTION OF THE DRAWINGS

Other objects and advantages of the invention will become apparent upon reading the following detailed description and upon reference to the drawings in which:

FIG. 10 is a side elevation view of the outlet fitting attachment of FIG. 8 with a large diameter outlet fitting mounted thereon;

FIG. 11 is a cross sectional view of the outlet fitting attachment of FIG. 8 with the large diameter outlet fitting of FIG. 10 mounted thereon; and FIG. 12 is a cross-sectional view of the outlet fitting attachment of FIG. 8 with a small diameter outlet fitting mounted thereon.

While the invention will be described in connection with a preferred embodiment thereof, it will be understood that it is not intended to limit the invention to that embodiment or to the details of the construction or arrangement of parts illustrated in the accompanying drawings.

DETAILED DESCRIPTION

Turning to FIGS. 1-7, a preferred embodiment of a tool 20 for fusing outlet fittings 90 in a plastic pipe can be used in different fusion process configurations without changing the location of the tool 20 on the pipe P. In a drill configuration, the tool 20 supports a drill adapter 70 and, in an outlet fitting configuration, the tool 20 supports an outlet fitting adapter 80.

Figure 4:
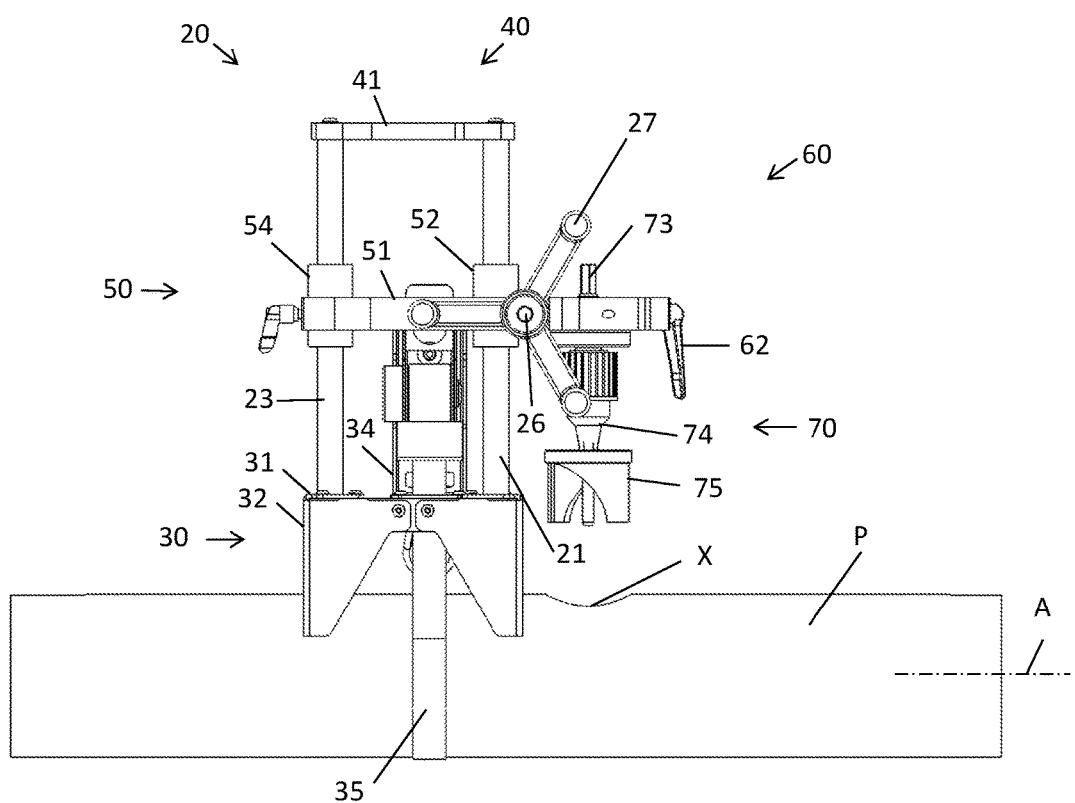
FIG. 4 is a side elevation view of the tool of FIG. 1 mounted on a pipe with the tool in a hole-drilling configuration.
Figure 5:
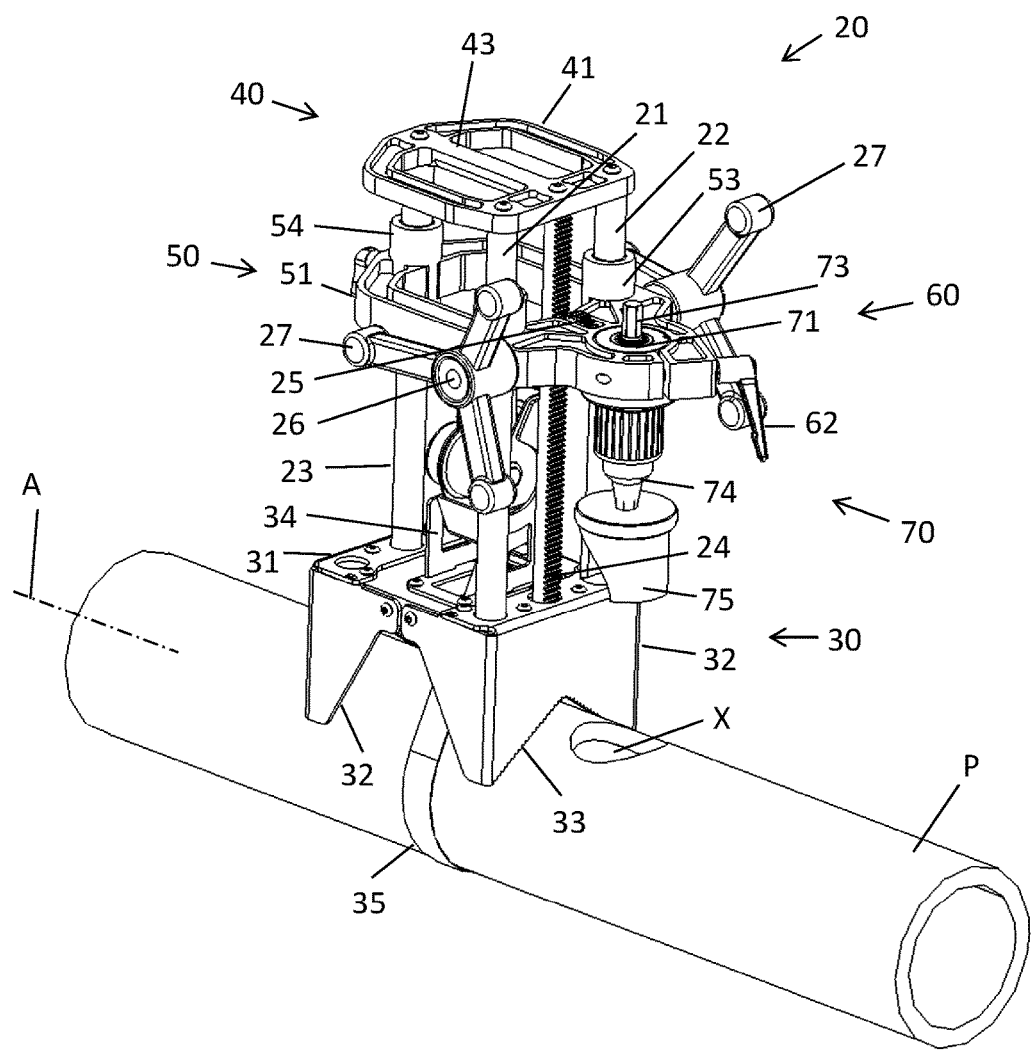
FIG. 5 is a perspective view of the tool of FIG. 1 mounted on a pipe with the tool in the hole-drilling configuration.
Figure 6:
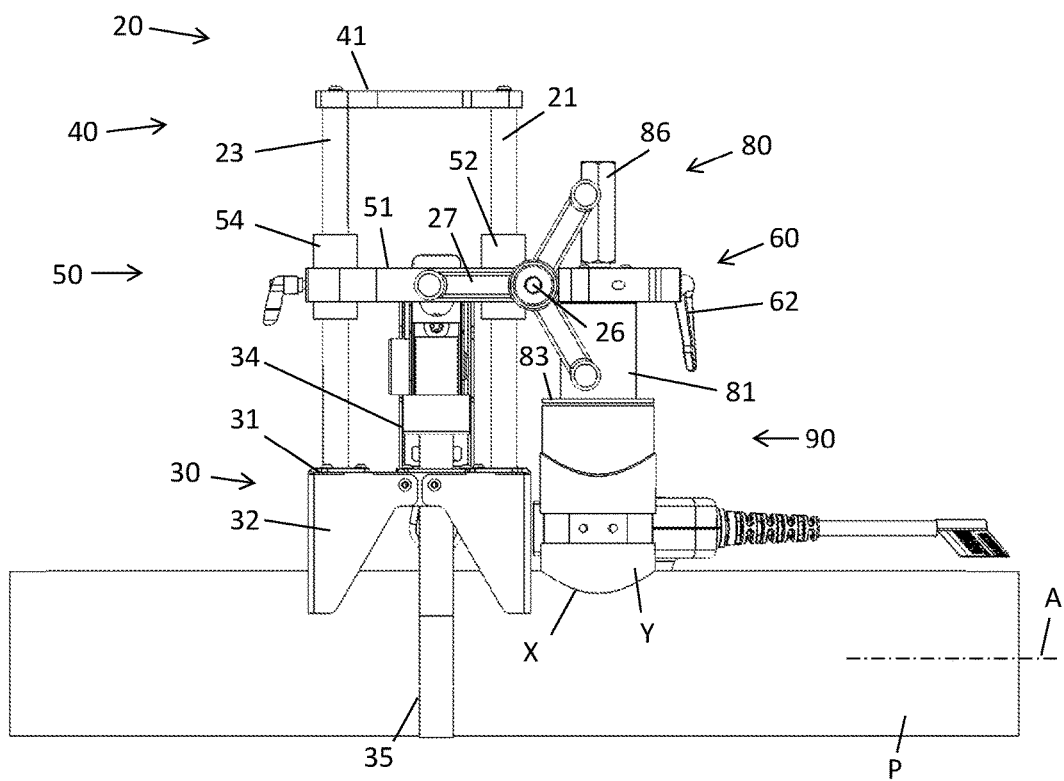
FIG. 6 is a side elevation view of the tool of FIG. 1 mounted on a pipe with the tool in an outlet fitting configuration.
Figure 7:
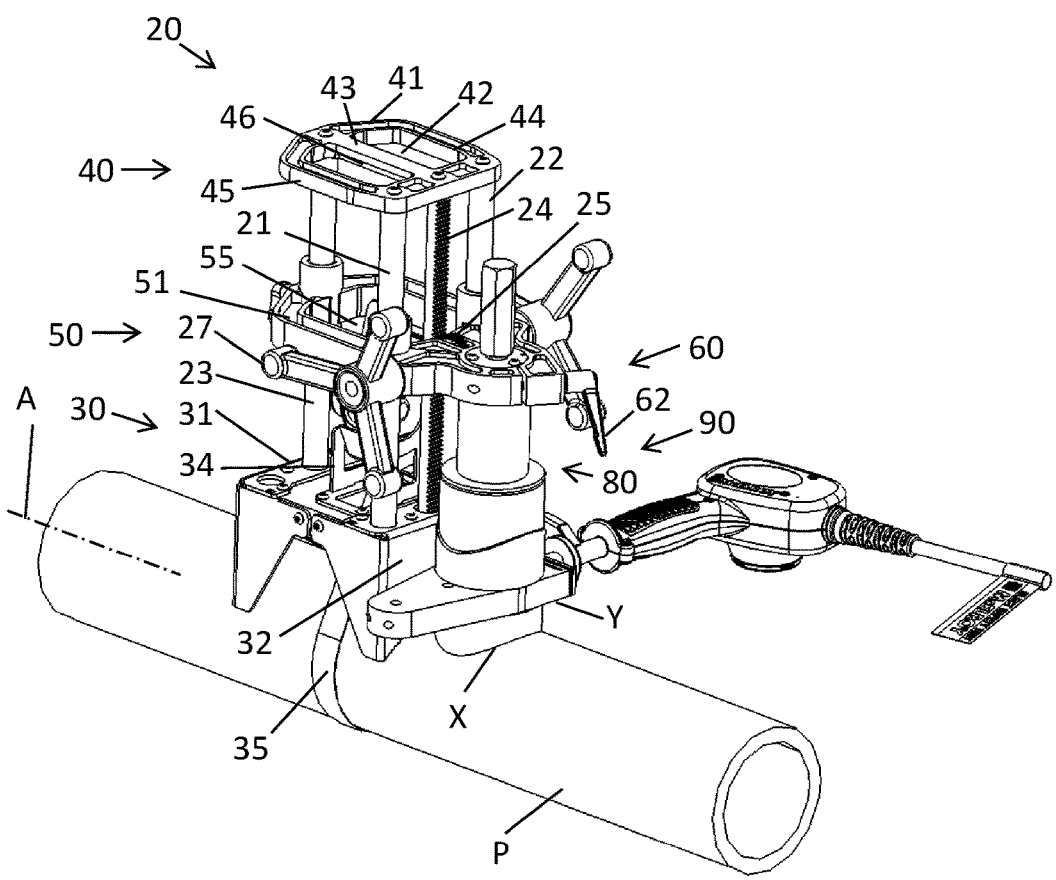
FIG. 7 is a perspective view of the tool of FIG. 1 mounted on a pipe with the tool in the outlet fitting configuration.
Figure 9:
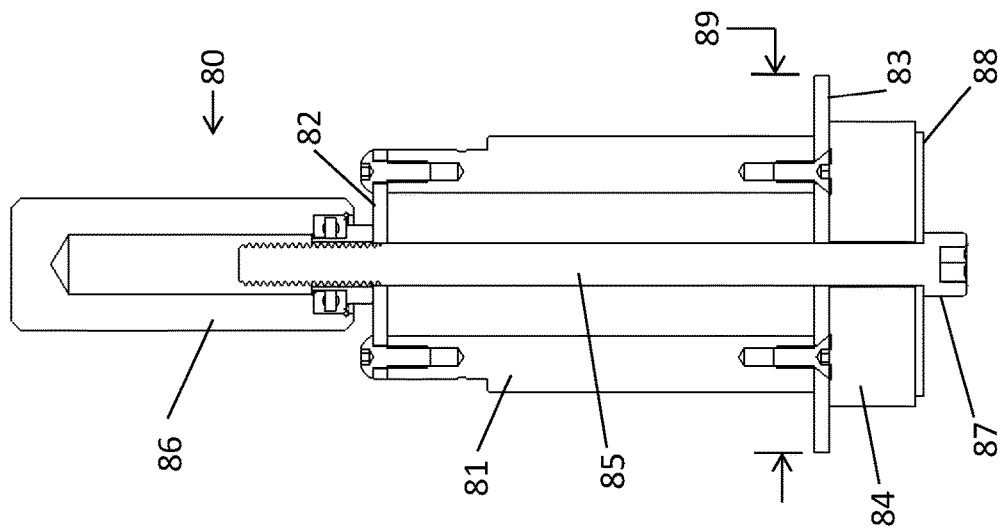
FIG. 9 is a cross-sectional view of the outlet fitting attachment of FIG. 8.
Figure 8:
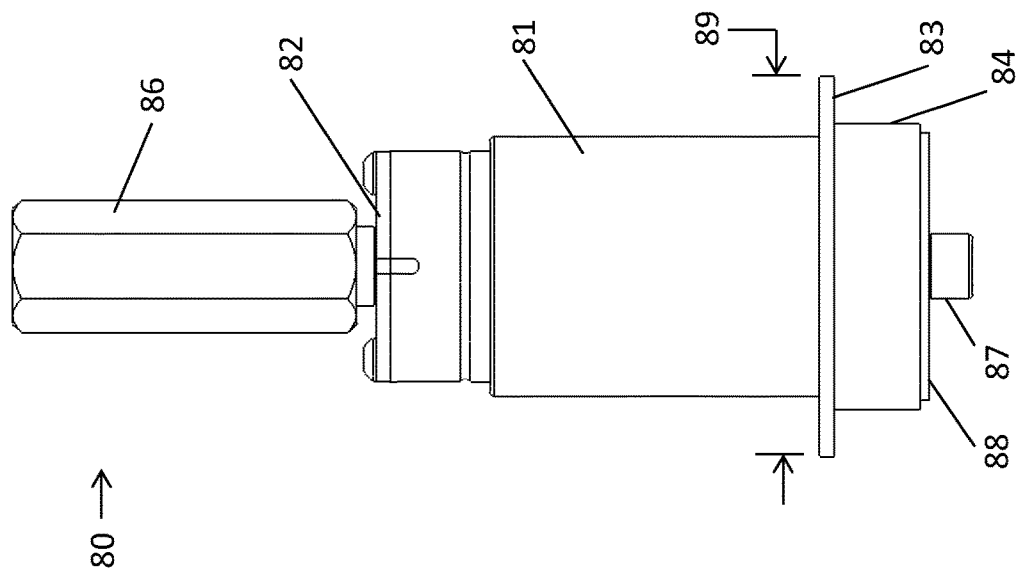
FIG. 8 is a side elevation view of an outlet fitting attachment of the tool of FIG. 1.

In FIGS. 4-5, the tool 20 is shown in its hole-drilling configuration mounted on the pipe P after the fusion hole X has been drilled in the side wall of the pipe P. In FIGS. 6-7, the tool 20 is shown in its outlet-fitting configuration mounted on the side wall of the pipe P after the outlet fitting adapter 80 has pressed the heater Y into the fusion hole X.

Figure 1:
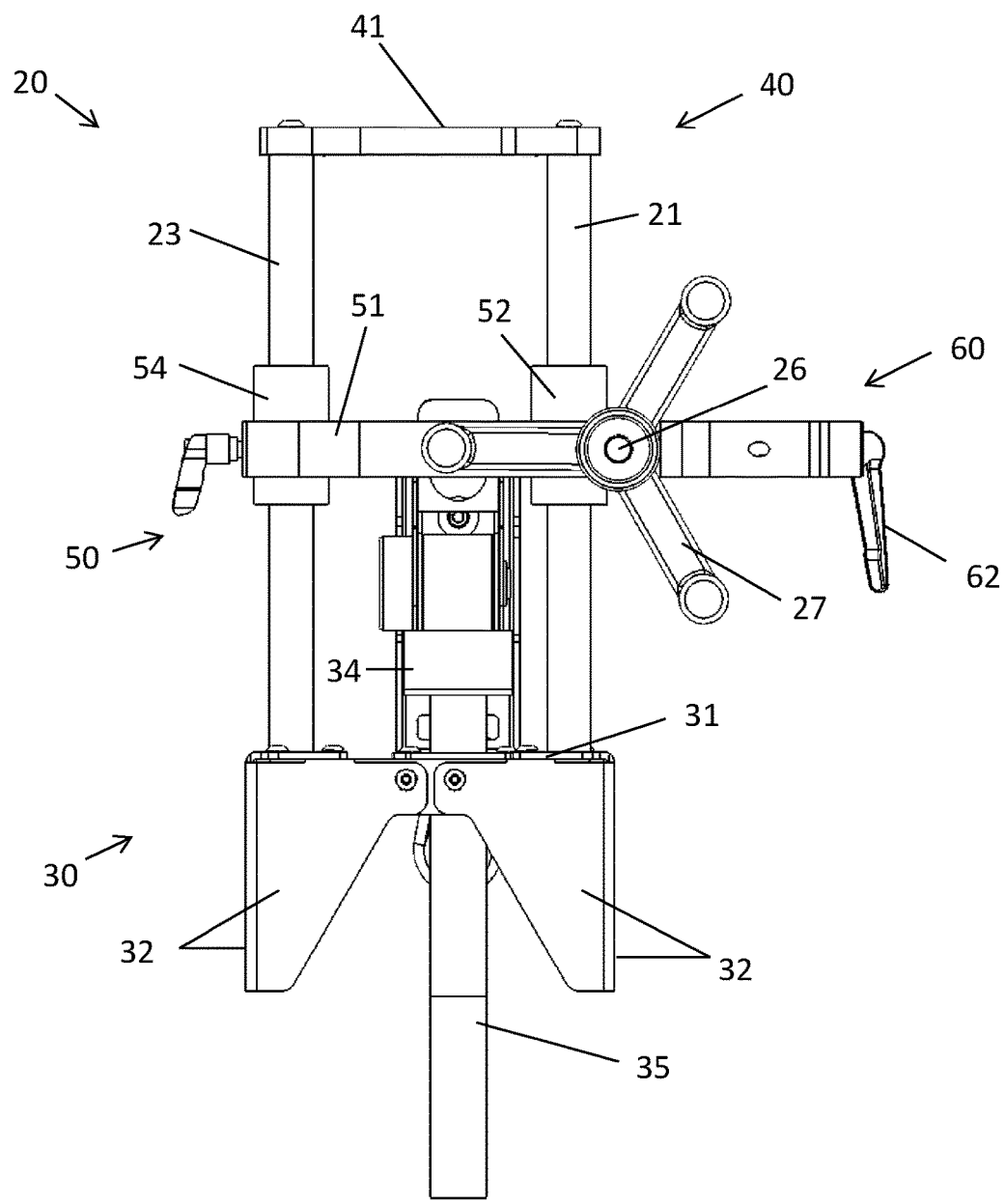
FIG. 1 is a side elevation view of a tool according to the invention.
Figure 2:
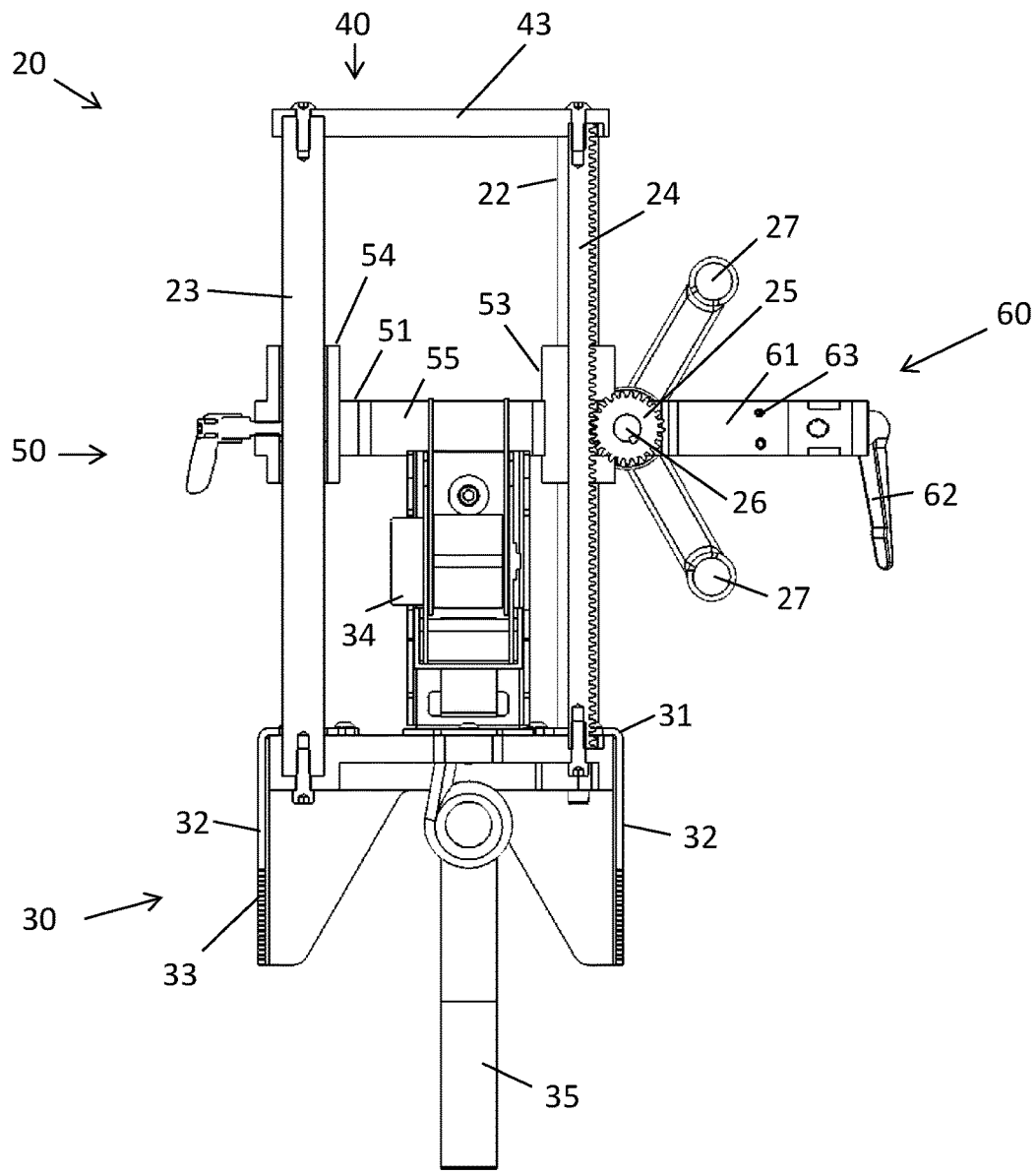
FIG. 2 is a cross-sectional view of the tool of FIG. 1 taken along a longitudinal center plane of the tool.
Figure 3:
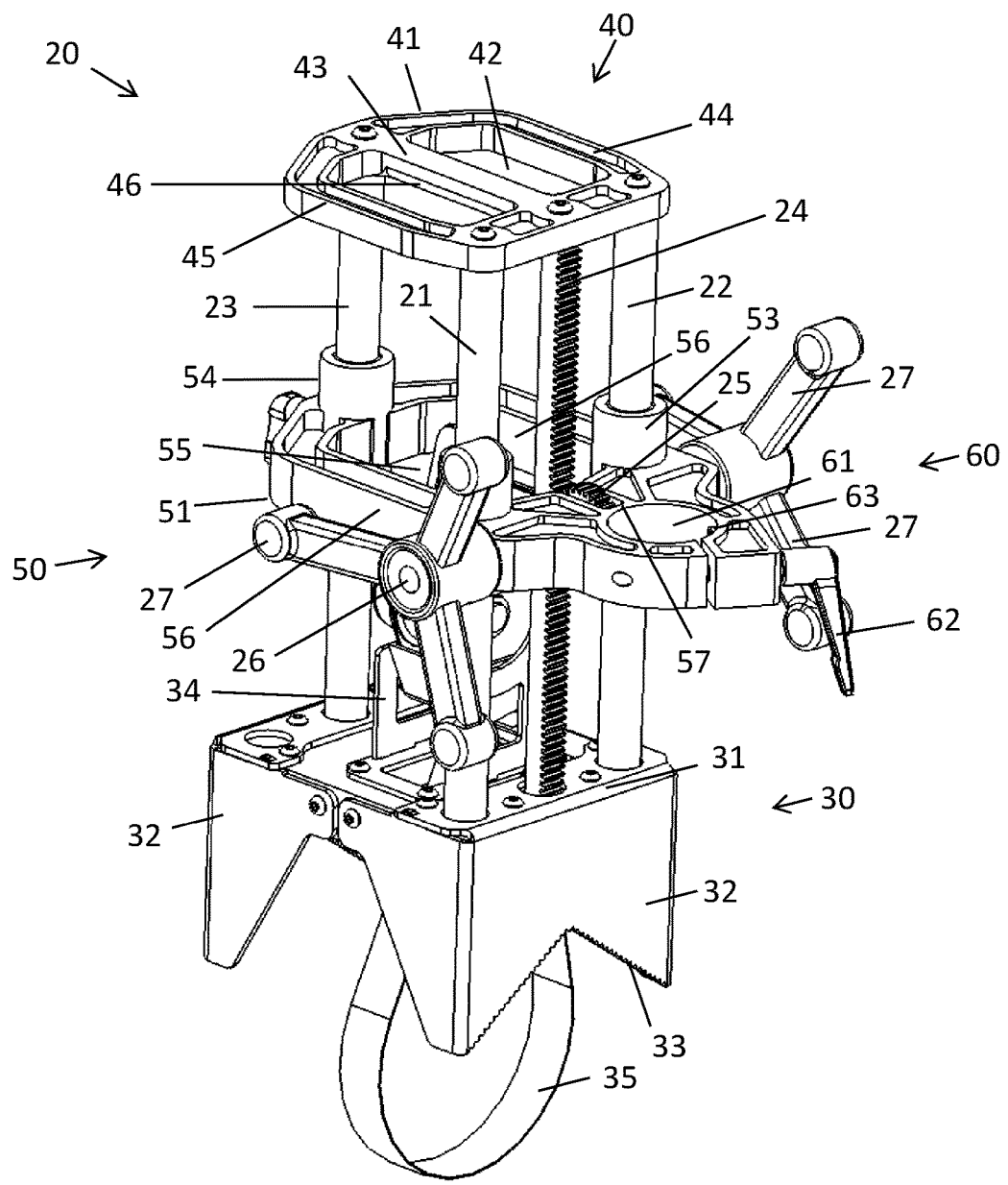
FIG. 3 is a perspective view of the tool of FIG. 1.

Looking at FIGS. 1-3, considered in relation to the pipe P on which the tool 20 will be mounted, the tool 20 has proximal and distal fixed bases 30 and 40 which are spaced apart by parallel guide rods 21, 22, 23. An intermediate movable base 50 is mounted on the guide rods 21, 22, 23. In the embodiment shown, the movable base is reciprocated on the guide rods 21, 22, 23 between the proximal and distal fixed bases 30 and 40 in response to the manual operation of a rack-and-pinion 24, 25 engaged on the movable base 50.

The proximal fixed base 30 shown has a base plate 31 supported by four side walls 32 and is preferably made of rigid aluminum. Each side wall 32 has a V-notch 33 tapering toward the base plate 31 and contoured to straddle the pipe P. A bracket 34, preferably made of steel sheet metal, is mounted on the base plate 31. A retractable ratchet strap 35 associated with the bracket 34 is adjustable to tightly girt the pipe P and secure an opposed pair of the V-notches 33 of the proximal base 30 against the pipe P.

As shown, the three guide rods 21, 22, 23 extend in parallel from the base plate 31 of the proximal fixed base 30 to the distal fixed base 40. The guide rods 21, 22, 23 are oriented in relation to the point along the pipe P at which an outlet fitting 90 is to be fused. The center axes of the first and second guide rods are proximal to the fusion point and are diametrically equidistant from, and extend in a plane transverse to, the center longitudinal axis A of the pipe P. The center axis of the third guide rod is distal from the fusion point and intersects the longitudinal center axis A of the pipe P. The guide rods 21, 22, 23 are preferably made of induction hardened chrome plated steel to facilitate smooth and precise actuation of the movable base 50 toward and away from the pipe P regardless of the radial orientation of the tool 20 relative to the longitudinal center axis A of the pipe P.

The distal fixed base 40 shown is a plate 41 preferably made of rigid aluminum and has a perimeter shaped to be secured against the distal ends of the guide rods 21, 22, 23. As best seen in FIG. 3, the plate 41 of the distal base 40 is parallel to base plate 31 of the proximal fixed base 30 and has a central void 42 bisected by a longitudinal rib 43 parallel to the longitudinal center axis A of the pipe P. The bisected void 42 and rib 43 afford perimeter and central hand grips 44, 45, 46 on the distal fixed base 40 to assist the operator in using the tool 20.

The intermediate movable base 50 shown is a plate 51 preferably made of rigid aluminum and having a perimeter shaped to permit orientation on the movable base 50 of first and second proximal guide bushings 52 and 53 and a third distal guide bushing 54 in alignment with and riding on the first and second proximal guide rods 21 and 22 and the third distal guide rod 23, respectively. As shown, the intermediate movable base 50 is parallel to the proximal and distal base plates 30 and 40, has a central void 55 between the bushings 52, 53, 54 and extends from the first and second proximal guide bushings 52 and 53 beyond the anticipated fusion point X of the pipe P on which the tool 20 is mounted. The central void 55 affords a passageway through the movable base 50 for the bracket 34 and the portions of the retractable ratchet strap 35 which extend above the base plate 31 of the proximal fixed base 30.

The center axis of the rack 24 of the rack-and-pinion 24, 25 extends parallel to, and bisects the plane defined by, the center axes of the first and second, or proximal, guide rods 21 and 22, thus intersecting the center longitudinal axis A of the pipe P on which the tool 20 is mounted. The rack 24 extends through an opening 57 in the intermediate movable base 50. The opening 57 also accommodates the pinion 25 of the rack and pinion 24, 25 with the teeth of the pinion 25 in engagement with the teeth of the rack 24. As shown, the pinion shaft 26 extends laterally in a bore through the side walls of the intermediate movable base 50 to a pair of multi-spoke handles 27, one on each end of the pinion shaft 26. The multi-spoke handles 27 facilitate manual operation of the rack-and-pinion 24, 25 and control of the position of the intermediate movable base 50 on the guide rods 21, 22, 23.

The portion of the intermediate movable base 50 which extends from the first and second proximal guide bushings 52 and 53 beyond the anticipated fusion point X of the pipe P is a split-collar clamp 60. As best seen in FIGS. 3, 5 and 7, a precision hole 61 in the clamp 60 locates and orients the drill adapter 70 and the outlet fitting adapter 80 which will be used in creating the fusion joint and the adapters 70 and 80 are secured in the precision hole 61 by operation of the lever 62 of the split-collar clamp 60. Looking at FIGS. 2 and 3, a pin 63 through the clamp 60 and engaging the mounted adapter 70 or 80 assures precise return of an adapter 70 or 80 to its original orientation in the precision hole 61 should be adapter 70 or 80 have been removed from the precision hole 61.

Looking at FIGS. 4-5, the drill adapter 70 is preferably a stepped piece of billet aluminum with radial ball bearings 71 on both ends supporting the load and providing a low friction environment for the drill adapter shaft 73. The shaft 73 is threaded on end to accept a drill chuck 74 used to attach the selected drill bit 75 to the drill adapter 70.

Looking at FIGS. 6-12, the outlet fitting adapter 80 is preferably an aluminum tube housing 81 with thin sheet metal caps 82, 83 on both ends used to expand a rubber grippy puck 84. An extended length screw 85 centered in the housing 81 by the caps 82, 83, when tightened by a knob 86 at one of the caps 82, pulls the screw head 87 at the other cap 83 to compress the rubber grippy puck 84 between a washer 88 and the screw-head cap 83 to expand the rubber grippy puck 84 and create a firm hold on the inner surface 91 of the outlet fitting 90, as best seen in FIGS. 11-12. The outlet fitting 90 is best seen in FIGS. 10-12, with FIGS. 10-11 illustrating the largest diameter 92 outlet fitting 90 which has an outer diameter 92 equal to the diameter of the screw-head cap 83 of the outlet fitting adapter 80 and FIG. 12 illustrating, by way of example, one smaller diameter 93 outlet fitting 90.

The steps involved in using the tool 20 to fuse an outlet fitting 90 in a plastic pipe P can be performed by a single operator. The fusion process includes a hole-drilling phase, a preparation-for-fusion phase, a melting phase and a fitting-to-pipe fusion phase.

The operator begins the hole-drilling phase of the fusion process by applying a mark to the side wall of the pipe P indicative of the location for the fusion hole X in the pipe P. The tool 20 is attached and oriented to the pipe P using a level and the ratchet strap 35. The drill adapter 70, including a selected drill bit 75, is inserted into and secured in the precision hole 61 of the clamp 60 of the movable base 50.

The pin 63 protruding into the precision hole 61 ensures that, even after removing the outlet fitting adapter 70, the original alignment is precisely restored. Since the tool 20 is strapped to the pipe P, relative concentricity during the entire process is easily maintained. The multi-spoke handles 27 are rotated to drive the moveable base 50 toward the proximal fixed base 30 sufficiently to assure that the center axis of the drill bit 75 will intersect the applied mark indicative of the location of the intended fusion hole X, thereby assuring that the outlet fitting 90 will be located correctly and oriented in the proper direction once the fusion process is completed. If necessary, the location of the tool 20 on the pipe P can be adjusted to achieve the correct location and orientation of the drill bit 75. The drill adapter 70 with the drill bit 75 is removed from, and the outlet fitting adapter 80 with the selected outlet fitting 90 is inserted into and secured in, the precision hole 61 in the split-collar clamp 60 of the moveable base 50. The multi-spoke handles 27 are operated to drive the moveable base 50 toward and orient the outlet fitting 90 to the pipe P. The outlet fitting adapter 80 with the outlet fitting 90 is removed from, and the drill adapter 70 with the bit 75 is reinserted into and secured in, the precision hole 61 of the split-collar clamp 60 of the movable base 50. A drill motor is applied to the drill adapter 70 to translate power through the drill bit 75. The multi-spoke handles 27 are operated to drive the moveable base 50 toward and the drill bit 75 into the pipe P, giving the operator feedback similar to a drill press, increasing control over the hole-drilling phase, promoting safety in the hole-drilling phase and reducing the amount of force required due to the mechanical advantage afforded by the rack-and-pinion 24, 25 and the multi-spoke handles 27. The hole-drilling phase of the fusion process is then completed by backing the drill bit 75 out of the pipe P and removing the drill adapter 70 with the bit 75 from the precision hole 61 of the split-collar clamp 60 of the movable base 50.

The preparation-for-fusion phase of the fusion process is well known. The perimeter of the fusion hole X is deburred and cleaned of any debris and the drilled fusion hole X, the outlet fitting 90 and the heater Y are wiped with a cotton-like fabric. With the preparation-for-fusion phase completed, the steps of the present fusion process are again focused on the tool 20.

The operator begins the melting phase of the fusion process by reinstalling the outlet fitting adapter 80 with the desired outlet fitting 90 in the precision hole 61 of the split-collar clamp 60 of the movable base 50. The result is that the outlet fitting 90 is automatically returned to its proper orientation relative to the pipe P because the precision hole 61 assures return of the outlet fitting 90 to its original orientation in the tool 20 and the ratchet strap 35 assures that the tool 20 always maintains its original orientation on the pipe P. The heater Y is inserted between the outlet fitting 90 and the fusion hole X in the pipe P. Since the time required to create melt around the entire perimeter of the pipe plastic may be significantly greater than the time required to create melt around the entire perimeter of the outlet fitting plastic, a thermal barrier (not shown) may be placed between the outlet fitting 90 and the heater Y to assist in pressing the heater Y into the fusion hole and to permit the perimeter of the fusion hole X to begin to melt before the perimeter of the outlet fitting 90 begins to melt. With or without the barrier, the multi-spoke handles 27 are rotated to drive the movable base 50 so that the outlet fitting adapter 80 presses the heater Y into the fusion hole X in the pipe P. Once melt is present around the entire perimeter of the fusion hole X of the pipe P, and if a thermal barrier is used, the multi-spoke handles 27 can be rotated slightly to release the pressure applied by the outlet fitting 90 to the barrier, the barrier can be removed from between the outlet fitting 90 and the heater Y and the multi-spoke handles 27 can again be rotated slightly to apply the pressure of the outlet fitting 90 to the heater Y. The outlet fitting 90 will begin heating when the heater Y comes into contact with the perimeter of the outlet fitting 90. Once a melt pattern has been established around the entire perimeter of the outlet fitting 90, the moveable base 50 is driven to displace the outlet fitting adapter 80 from the heater Y and the heater Y is removed from between the outlet fitting 90 and the pipe P. The fusion process is then completed by driving the moveable base 50 toward the pipe P to a point sufficient to create an evenly melted and concentrically applied fitting in the pipe melt pattern of the fusion hole X.

Typically, the completed fusion condition is maintained for approximately 30 to 90 seconds before the knob 86 is loosened, releasing the outlet fitting 90 which allows the moveable base 50 to be raised to release the fused joint which is then permitted to cool for several minutes.

The same tool 20 can be used with pipes P and with outlet fittings 90 having wide ranges of diameters 92-93. The fusion process requires only one operator, employs no scrap material (such as wooden 2×4s) to perform the process, improves fusion process efficiency and produces precise, high quality, reliable fused joints. The tool 20 significantly reduces the possibilities of inconsistency of the fusion process.

Thus, it is apparent that there has been provided, in accordance with the invention, a tool, and a method of using the tool, for fusing outlet fittings in a plastic pipe that fully satisfies the objects, aims and advantages set forth above. While the invention has been described in conjunction with a specific embodiment thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A tool for fusing an outlet fitting in a side wall of a plastic pipe at a predetermined point along a center longitudinal axis of the pipe, the tool comprising:
   a proximal base adapted to be secured against the side wall of the pipe;
   first and second parallel guide rods fixed to said proximal base and having center longitudinal axes extending on opposite sides of, and in a plane transverse to, the center longitudinal axis of the pipe, said first and second guide rods being proximal in relation to the predetermined point along the pipe center longitudinal axis;
   a movable plate mounted for reciprocation on said first and second guide rods and having a hole oriented to align a drill adapter and an outlet fitting adapter interchangeably inserted therein on an axis extending through the predetermined point; and
   an actuator engaged with said movable plate to selectively reciprocate said movable plate on said first and second guide rods toward and away from the pipe, said actuator comprising a rack-and-pinion between and parallel to said first and second guide rods to reciprocate said movable plate in response to manual operation of a pinion of said rack-and-pinion.

2. A tool for fusing an outlet fitting in a side wall of a plastic pipe at a predetermined point along a center longitudinal axis of the pipe, the tool comprising:
- a proximal base adapted to be secured against the side wall of the pipe with a fixed plate of said base parallel to a plane tangent to the side wall of the pipe and spaced from the predetermined point along the pipe center longitudinal axis;
- three parallel guide rods fixed on and perpendicular to said proximal base, center longitudinal axes of a first and a second of said guide rods being diametrically equidistant from, and extending in a plane transverse to, the center longitudinal axis of the pipe and a center longitudinal axis of a third of said guide rods intersecting the longitudinal center axis of the pipe, said first and second guide rods and said third guide rod being proximal and distal, respectively, in relation to the predetermined point along the pipe center longitudinal axis;
- a movable plate mounted for reciprocation on said three guide rods and parallel with said fixed plate of said proximal base and having a hole oriented to align a drill adapter and an outlet fitting adapter interchangeably inserted therein on an axis extending through the predetermined point; and
- a rack-and-pinion between said first and second guide rods and engaged on said movable plate to reciprocate said movable plate on said three guide rods in response to manual operation of said rack-and-pinion.

3. A tool according to claim 2 further comprising a distal fixed base secured against distal ends of said guide rods parallel to said proximal base.

4. A tool according to claim 2 further comprising first and second proximal guide bushings and a third distal guide bushing in alignment with and riding on the first and second proximal guide rods and the third distal guide rod, respectively.

5. A tool according to claim 2, a rack of said rack-and-pinion extending parallel to and bisecting a plane defined by center axes of said first and second proximal guide rods and extending through an opening in said movable plate accommodating a pinion of said rack-and-pinion with teeth of said pinion in engagement with teeth of said rack.

6. A tool according to claim 2 further comprising a pair of multi-spoke handles, one on each end of a shaft of said pinion, facilitating manual operation of said rack-and-pinion.

7. A tool according to claim 2, said hole of said movable plate being defined by a split-collar clamp operated by a split-clamp lever.

8. A tool according to claim 2 further comprising an outlet fitting adapter comprising a tubular housing with caps on both ends and an extended length screw which, when tightened by a knob at one of said ends, pulls a head of said screw to compress a rubber grippy puck against said cap of another of said ends to expand a rubber grippy puck therebetween.

9. A tool according to claim 8 further comprising an outlet fitting secured to said outlet fitting adapter by expansion of said rubber grippy puck therein.

* * * * *